United States Patent
Rushmore et al.

(10) Patent No.: US 8,517,355 B2
(45) Date of Patent: Aug. 27, 2013

(54) EVAPORATIVE COOLING TOWER AND METHOD

(75) Inventors: Kelly D. Rushmore, St. Clair, MI (US); James H. Shoffner, Fort Gratiot, MI (US)

(73) Assignee: MiTek Holdings, Inc., Wilmington, DE (US)

(*) Notice: Subject to any disclaimer, the term of this patent is extended or adjusted under 35 U.S.C. 154(b) by 0 days.

(21) Appl. No.: 13/465,816

(22) Filed: May 7, 2012

(65) Prior Publication Data

US 2012/0217662 A1  Aug. 30, 2012

Related U.S. Application Data

(63) Continuation of application No. 13/108,491, filed on May 16, 2011, now abandoned, which is a continuation of application No. 12/110,416, filed on Apr. 28, 2008, now Pat. No. 7,942,391.

(60) Provisional application No. 60/926,814, filed on Apr. 27, 2007.

(51) Int. Cl.
*B01F 3/04* (2006.01)

(52) U.S. Cl.
USPC .................. 261/152; 96/355; 165/900

(58) Field of Classification Search
USPC ....... 261/112.1, 152, 155, 158–161, DIG. 11, 261/DIG. 77; 165/900; 96/355
See application file for complete search history.

(56) References Cited

U.S. PATENT DOCUMENTS

| | | | |
|---|---|---|---|
| 1,002,578 | A | 9/1911 | Gayley |
| 1,287,630 | A | 12/1918 | Burhorn |
| 3,052,105 | A | 9/1962 | Bowman et al. |
| 3,731,461 | A | 5/1973 | Hamon |
| 3,831,667 | A | 8/1974 | Kilgore et al. |
| 3,917,764 | A | 11/1975 | Phelps |
| 4,019,951 | A | 4/1977 | Kragh |
| 4,299,786 | A | 11/1981 | Sanderson et al. |
| 4,318,772 | A | 3/1982 | Kragh |
| 4,324,749 | A | 4/1982 | Bronner |
| 4,435,339 | A | 3/1984 | Kragh |
| 4,530,804 | A | 7/1985 | Cates et al. |
| 4,632,787 | A | 12/1986 | Tippmann |
| 4,834,955 | A | 5/1989 | Mouche et al. |
| 5,145,585 | A | 9/1992 | Coke |
| 5,944,094 | A | 8/1999 | Kinney, Jr. et al. |
| 6,145,818 | A | 11/2000 | Herbst |

(Continued)

FOREIGN PATENT DOCUMENTS

| | | |
|---|---|---|
| JP | 54016748 A | 2/1979 |
| JP | 55043319 A | 3/1980 |
| JP | 60232492 A | 11/1985 |

*Primary Examiner* — Richard L Chiesa
(74) *Attorney, Agent, or Firm* — Senniger Powers LLP

(57) ABSTRACT

A cooling tower for evaporating water from a brine solution is provided and may include a housing having an air inlet and a brine inlet. The cooling tower may also include a heat-exchange assembly having a heat-exchange media that suspends the brine solution and at least one nozzle in fluid communication with the brine inlet. The at least one nozzle may receive the brine solution from the brine inlet and may transfer the brine solution from the brine inlet to the heat-exchange media to allow the heat-exchange media to transfer moisture from the brine solution to air received from the air inlet to reduce the moisture content of the brine solution.

17 Claims, 3 Drawing Sheets

(56) References Cited

U.S. PATENT DOCUMENTS

| | | |
|---|---|---|
| 7,510,174 B2 | 3/2009 | Kammerzell |
| 7,942,391 B2 | 5/2011 | Rushmore et al. |
| 2008/0264078 A1* | 10/2008 | Rushmore et al. .............. 62/123 |
| 2011/0215487 A1* | 9/2011 | Rushmore et al. ............ 261/131 |

* cited by examiner

EVAPORATIVE COOLING TOWER AND METHOD

CROSS-REFERENCE TO RELATED APPLICATIONS

This application is a continuation of U.S. application Ser. No. 13/108,491 filed on May 16, 2011, now abandoned, which is a continuation of U.S. application Ser. No. 12/110,416, filed on Apr. 28, 2008, now U.S. Pat. No. 7,942,391. This application claims the benefit of U.S. Provisional Application No. 60/926,814, filed on Apr. 27, 2007. The disclosures of the above applications are incorporated herein by reference.

FIELD

The present disclosure relates to cooling towers and more particularly to a cooling tower and method for evaporating water from a brine solution.

BACKGROUND

The statements in this section merely provide background information related to the present disclosure and may not constitute prior art.

Highly concentrated brine (i.e., three to seven times the concentration of salt water) may be stored in an underground storage facility for use in storing and pumping commercial gases such as propane gas, butane, and natural gas and liquids such as petroleum and oil stored in underground caverns. While stored concentrated brine is usable in storing and pumping commercial gases and liquids, rain and snow often dilute the stored brine and render the brine less effective. Therefore, diluted brine is typically removed from use and replaced with a highly concentrated brine solution.

Diluted brine may be discarded to ensure that the brine solution in use is maintained at a predetermined salt concentration. Alternatively, a diluted brine solution may be treated to return the brine solution to a desired salt concentration prior to returning the brine solution to active use within a storage facility. While conventional brine treatment systems adequately remove excess water from a brine solution, conventional brine treatment systems are typically complicated and therefore costly.

SUMMARY

A cooling tower for evaporating water from a brine solution is provided and may include a housing having an air inlet and a brine inlet. The cooling tower may also include a heat-exchange assembly having a heat-exchange media that suspends the brine solution and at least one nozzle in fluid communication with the brine inlet. The at least one nozzle may receive the brine solution from the brine inlet and may transfer the brine solution from the brine inlet to the heat-exchange media to allow the heat-exchange media to transfer moisture from the brine solution to air received from the air inlet to reduce the moisture content of the brine solution.

In another configuration, a cooling tower for evaporating water from a brine solution is provided and may include a housing having an air inlet and an air outlet. The cooling tower may also include a heat-exchange assembly having a heat-exchange media disposed generally within the housing that suspends the brine solution therein, at least one nozzle for depositing the brine solution on the heat-exchange media, and at least one heat tube disposed between the at least one nozzle and the heat-exchange media. The heat-exchange media may transfer moisture from the brine solution to the air to reduce the moisture content of the brine solution.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
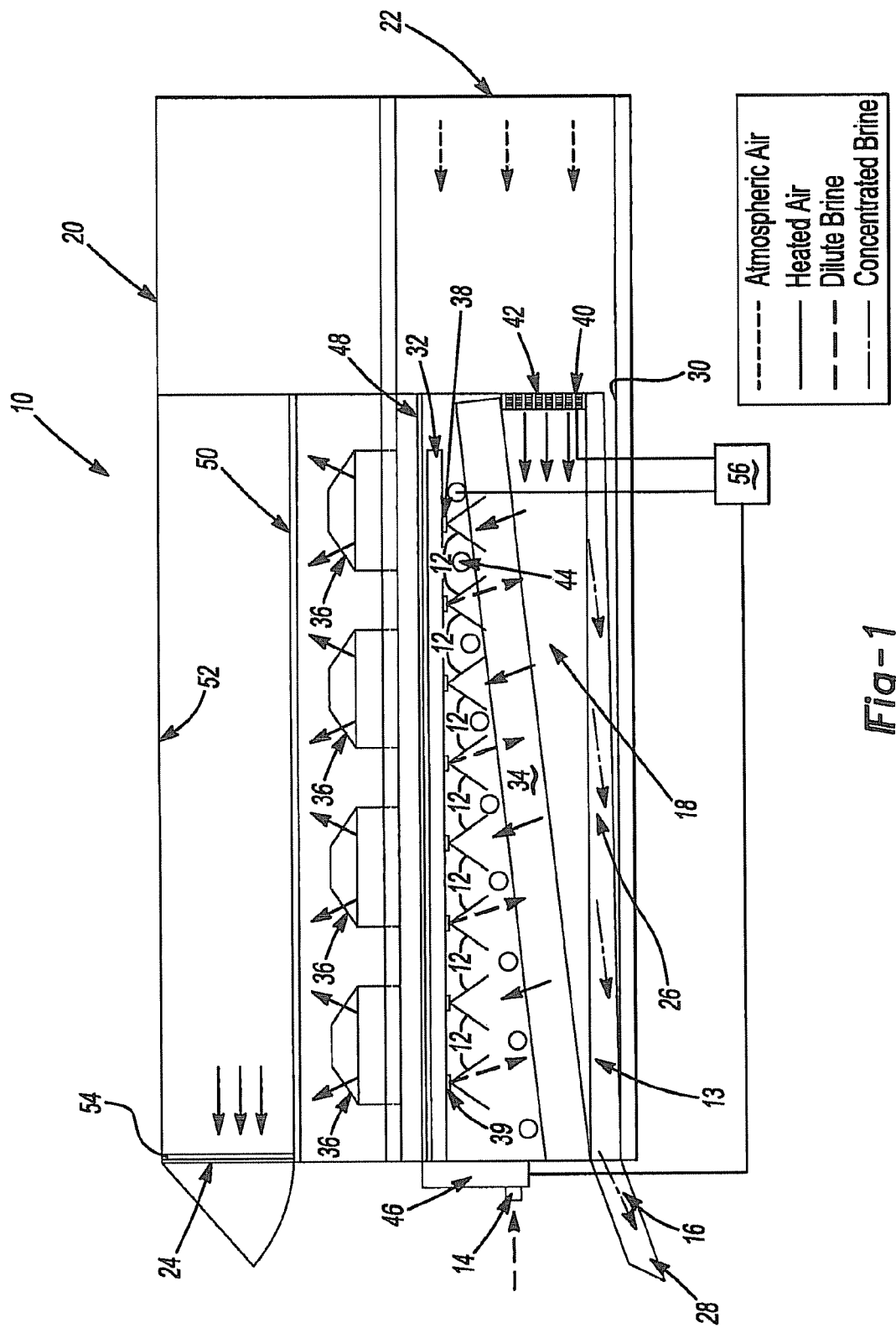
FIG. 1 is a schematic representation of a cooling tower in accordance with the principles of the present teachings for use in evaporating water from a brine solution.
Figure 2:
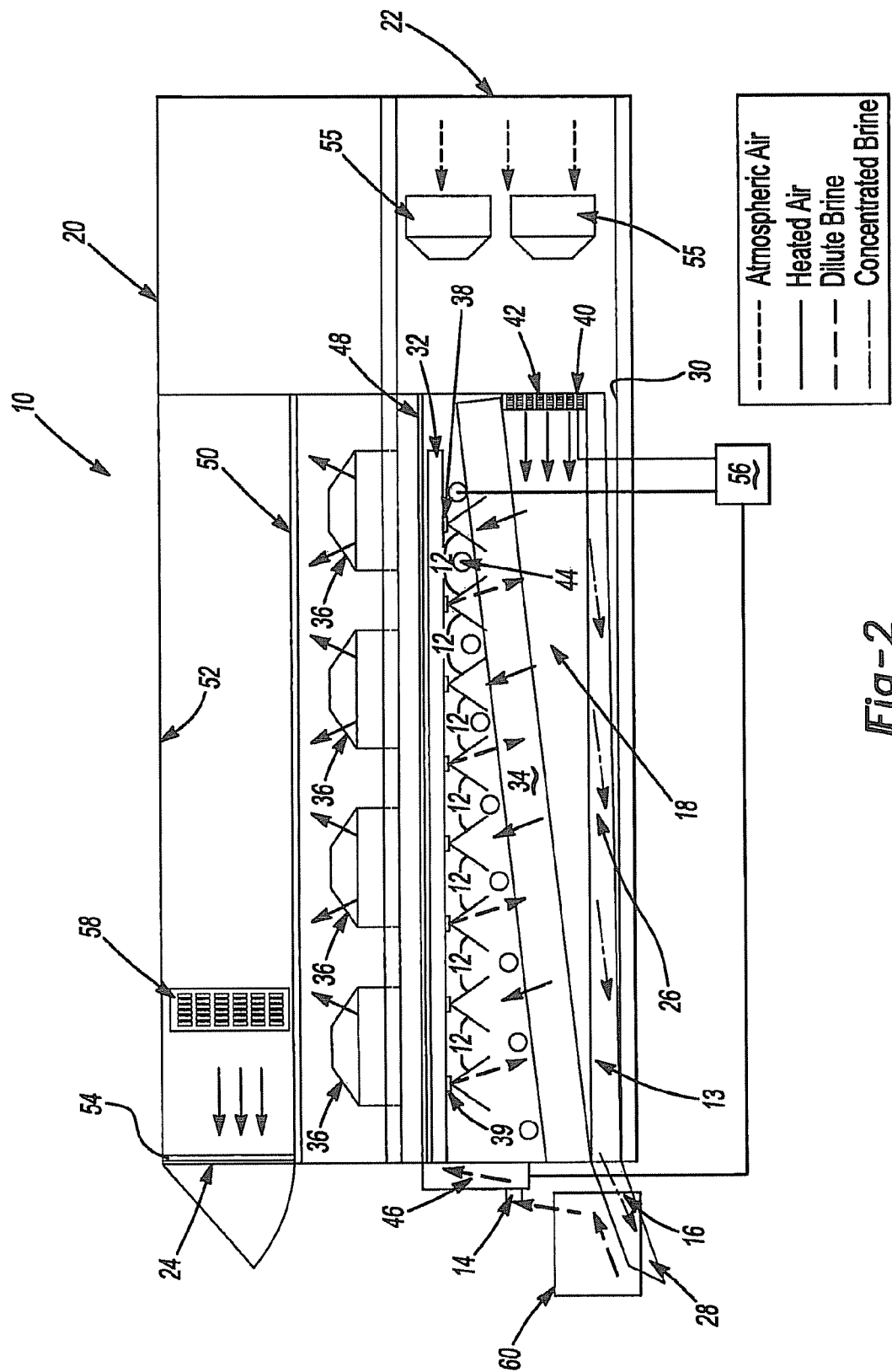
FIG. 2 is a schematic representation of a cooling tower in accordance with the principles of the present teachings for use in evaporating water from a brine solution.

With reference to FIGS. 1 and 2, a cooling tower 10 is provided for use in evaporating water from a diluted brine solution 12. The cooling tower 10 includes an inlet 14, an outlet 16, and a heat-exchange assembly 18 disposed generally between the inlet 14 and outlet 16. The heat-exchange assembly 18 receives the diluted brine solution 12 from the inlet 14 and removes water from the diluted brine solution 12 prior to a concentrated brine solution 13 exiting the cooling tower 10 at the outlet 16.

The cooling tower 10 may include a housing 20 having an air inlet 22, a moist-air outlet 24, a sloped-brine basin 26, and an outlet pipe 28 disposed proximate to the outlet 16. The air inlet 22 receives ambient air and directs the ambient air generally towards the heat-exchange assembly 18. The moist-air outlet 24 is disposed generally on an opposite end of the housing 20 from the air inlet 22 and expels moist air from the housing 20 once air received at the air inlet 22 passes through the heat-exchange assembly 18. The sloped-brine basin 26 is disposed generally between the air inlet 22 and the moist-air outlet 24 and is positioned at an angle relative to a bottom surface 30 of the housing 20 to allow the concentrated-brine solution 13 to flow towards the outlet pipe 28 of the housing 20.

The heat-exchange assembly 18 is disposed generally within the housing 20 of the cooling tower 10 and includes a brine-distribution header 32, a heat-exchange media 34, and a series of draw-through fans 36 (FIGS. 1 and 2) and/or a series of blow-through fans 55 (FIG. 2). The brine-distribution header 32 is fluidly coupled to the inlet 14 of the housing 20 and receives the diluted brine solution 12 from the inlet 14. The diluted brine solution 12 moves within the brine-distribution header 32 and is ejected from the brine-distribution header 32 via a plurality of nozzles 38. The nozzles 38 may include an opening 39 that mists the diluted brine solution 12 to improve evaporation of water from the diluted brine solution 12.

The heat-exchange media 34 is disposed generally between the brine-distribution header 32 and the sloped-brine basin 26 of the housing 20. The heat-exchange media 34 receives the diluted brine solution 12 from the nozzles 38 of the brine-distribution header 32 and suspends the diluted brine solution 12 within the housing 20 between the brine-distribution header 32 and the sloped-brine basin 26.

The heat-exchange media 34 may include a series of webs and/or ribs defining a series of openings therebetween (none shown) to allow air flow through the heat-exchange media 34 while concurrently allowing droplets of the diluted brine solution 12 to rest on the heat-exchange media 34. The heat-exchange media 34 is positioned within the housing 20 at an angle relative to the bottom surface 30 of the housing 20 to increase the overall size of the heat-exchange media 34. As can be appreciated, positioning the heat-exchange media 34 such that the heat-exchange media 34 is substantially parallel to the bottom surface 30 of the housing 20 would necessitate reducing the overall length of the heat-exchange media 34 to fit the heat-exchange media 34 within the housing 20. Furthermore, positioning the heat-exchange media 34 such that the heat-exchange media 34 is substantially parallel to the bottom surface 30 of the housing 20 would result in a reduction in air flow into the heat-exchange assembly 18, as an inlet 40 of the heat-exchange assembly 18 would be reduced. Reducing the inlet 40 of the heat-exchange assembly 18 reduces the volume of air that enters the heat-exchange assembly 18 from the air inlet 22 of the housing 20.

The series of draw-through fans 36 are disposed within the housing 20 on an opposite side of the brine-distribution header 32 from the heat-exchange media 34. The draw-through fans 36 create air flow through the heat-exchange media 34 and around the brine-distribution header 32 by imparting a fluid pressure on the air inlet 22 to draw air into the air inlet 22. Air drawn into the air inlet 22 via the force imparted on the air by the series of draw-through fans 36 causes the air to enter the heat-exchange assembly 18 generally at the inlet 40. The entering air is then forced through the heat-exchange media 34 and around the brine-distribution header 32 prior to being expelled from the housing 20 at the moist-air outlet 24.

The series of blow-through fans 55 may be positioned within the housing 20 generally between the air inlet 22 and the heat-exchange media 34 either in place of or in conjunction with the draw-through fans 36 (FIG. 2). The blow-through fans 55 create air flow through the heat-exchange media 34 and around the brine-distribution header 32 by imparting fluid pressure on the air inlet 22 to draw air into the air inlet 22 and/or blow air through the air inlet 22. Air drawn or blown through the air inlet 22 by the blow-through fans 55 causes the air to enter the heat-exchange assembly 18 generally at the inlet 40. The entering air is then forced through the heat-exchange media 34 and around the brine-distribution header 32 prior to being expelled from the housing 20 at the moist-air outlet 24.

The heat-exchange assembly 18 may include a series of heat exchangers to heat the air received from the air inlet 22. For example, a heat exchanger 42 may be disposed proximate to the inlet 40 of the heat-exchange assembly 18 to heat air received from the air inlet 22. In addition, a series of heat tubes 44 may be positioned generally between the heat-exchange media 34 and the nozzles 38 of the brine-distribution header 32 such that the diluted brine solution 12 contacts the heat tubes 44 prior to reaching the heat-exchange media 34. Further yet, a heat exchanger 46 may be disposed proximate to the inlet 14 of the housing 20 to heat the incoming diluted brine solution 12 prior to the diluted brine solution 12 being received within the brine-distribution header 32.

In one configuration, a heat exchanger 58 (FIG. 2) may be positioned generally between the heat-exchange media 34 and the moist-air outlet 24 to extract heat and moisture from the exiting air prior to expelling the air from housing 18. Extracting heat from the air cools the air while extracting moisture from the air prevents a "snowing" effect during cold-weather months. For example, if air is expelled at the outlet 24 with a sufficient moisture content, the moist air may freeze due to cold ambient conditions, thereby causing snow to be expelled from the housing 18 at the outlet 24.

Figure 3:
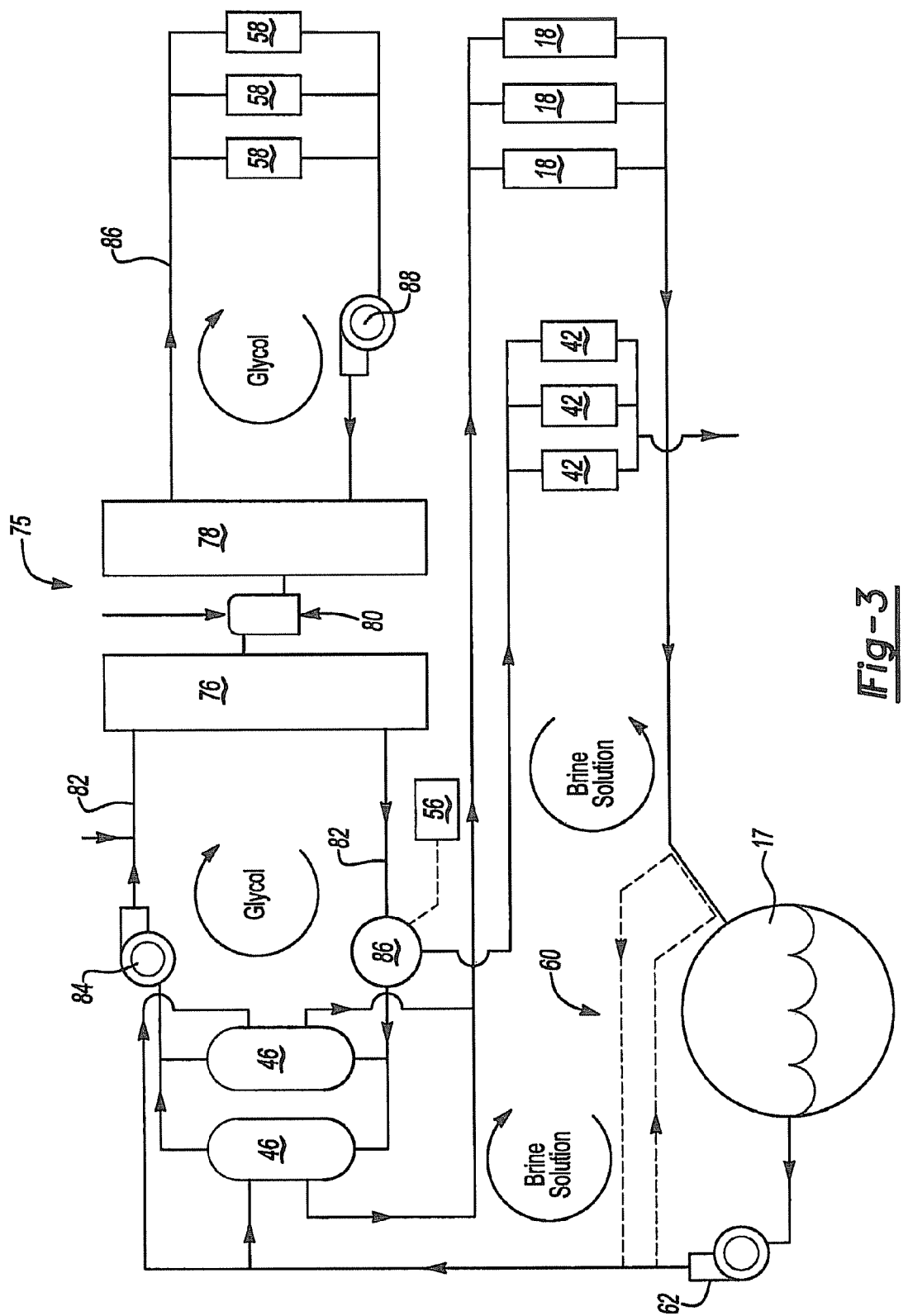
FIG. 3 is a schematic representation of a material flow diagram for use with the cooling tower of FIG. 2.

A heat exchanger 60 may be disposed generally between the outlet 16 and a brine pool 17 (FIG. 3). The heat exchanger 60 may be in thermal contact with the concentrated brine solution 13 exiting the outlet 16 to extract heat from the concentrated brine solution 13 prior to the concentrated brine solution 13 being deposited in the brine pool 17. The reclaimed heat from the concentrated brine solution 13 may be supplied to the brine solution upstream of the inlet 14 to heat the incoming brine solution (FIG. 3). The heat-exchange assembly 18 may include any combination of the heat exchanger 42, heat tubes 44, heater coil 46, and heat exchanger 60 to raise a temperature of both the inlet air received at the air inlet 22 of the housing 20 and the temperature of the diluted brine solution 12 received at the inlet 14 of the housing 20.

As described above, heat exchanger 58 may be positioned generally between the heat-exchange media 34 and the outlet 16 to extract heat and moisture from the exiting air prior to expelling the air from housing 18. The heat exchanger 58 may also be used as a source of heat rejection for the heat exchanger 46 disposed at the inlet 14, as will be described further below with regard to FIG. 3.

The housing 20 may include a first mist eliminator 48 disposed generally between the series of fans 36 and the brine-distribution header 32 for removing sodium chloride from the air prior to venting the air from the housing 20 via the moist-air outlet 24. A second mist eliminator 50 may be disposed between the series of fans 36 and a top surface 52 of the housing 20 and a third mist eliminator 54 may be disposed proximate to the moist-air outlet 24 of the housing 20 to further remove any sodium chloride from the moist air prior to venting the moist air to atmosphere via the moist-air outlet 24.

A controller 56 may be in communication with the heat exchanger 42, heat tubes 44, and heater coil 46 to regulate the amount of heat supplied to the incoming air and/or to the incoming diluted brine solution 12. Regulating the amount of heat supplied to the incoming air at the inlet 22 and to the diluted brine solution 12 at the inlet 14 controls an amount of water evaporated from the diluted brine solution 12 and, therefore, indirectly controls the salt concentration of the concentrated brine solution 13 exiting the housing 20 via the sloped-brine basin 26 and the outlet pipe 28.

The controller 56 may be in communication with the heat exchanger 42, heat tubes 44, and heater coil 46 via a wired connection or a wireless connection and may be adjusted for outdoor ambient conditions. For example, depending on weather conditions, the heat exchanger 42, heat tubes 44, and heater coil 46 may not be in use, as the incoming air at the air inlet 22 includes a sufficiently low relative humidity and high dry bulb temperatures. Conversely, when ambient conditions are relatively cold, the controller 56 may energize one or any combination of the heat exchanger 42, heat tubes 44, and heater coil 46 to heat the incoming air at the air inlet 22 to lower the relative humidity and raise the dry bulb temperatures of the incoming air and to heat the incoming diluted brine solution 12 to improve evaporation of water therefrom.

With continued reference to FIG. 1, operation of the cooling tower 10 will be described in detail. Ambient air is initially drawn into the housing 20 of the cooling tower 10 at the air inlet 22. The air received at the air inlet 22 is directed generally towards the inlet 40 of the heat-exchange assembly 18. The air flows through the heat exchanger 42 and may be heated by the heat exchanger 42 if the heat exchanger 42 is energized by the controller 56. The inlet air is drawn through the heat exchanger 42 and generally through the heat-exchange media 34 under a force imparted on the air by the series of draw-through fans 36 (FIGS. 1 and 2) and/or by the series of blow-through fans 55 (FIG. 2). While the inlet air is flowing through the heat exchanger 42 and the heat-exchange media 34, the diluted brine solution 12 may absorb heat as it passes through the heat exchanger 60 before the brine solution 12 is received at the inlet 14 of the housing 20 and may additionally be heated by the heat exchanger 46 after passing through the inlet 14. The diluted brine solution 12 is received within the brine-distribution header 32 and is ejected from the plurality of nozzles 38 such that the diluted brine solution 12 is directed generally towards the heat-exchange media 34. The diluted brine solution 12 may further be heated by the heater tubes 44 disposed generally between the brine-distribution header 32 and the heat-exchange media 34.

The incoming air comes in contact with the diluted brine solution 12 and causes water disposed within the diluted brine solution 12 to evaporate due to the low relative humidity and high dry bulb temperatures of the incoming air as well as an evaporative cooling enthalpy driving force. Use of the heater coil 46 and heat tubes 44 facilitate evaporation of water from the diluted brine solution 12 by increasing the molecular kinetic energy and, thus, the vapor pressure of the diluted brine solution 12. Flow of air through the heat-exchange media 34 comes in contact with the diluted brine solution 12 ejected from the nozzles 38 and attracts water molecules from the diluted brine solution 12, thereby causing the flow of air through the heat-exchange media 34 and within the housing 20 to become saturated or near saturated.

The saturated air flows through the first mist eliminator 48, the second mist eliminator 50, and the third mist eliminator 54 to remove any sodium chloride from the moist air prior to the moist air exiting the housing 20 at the moist-air outlet 24. The saturated air may then pass through the heat exchanger 58 providing to cool and remove moisture from the exiting air before the air reaches the outlet 24. As noted above, cooling and removing moisture from the exiting air prevents immediate freezing of the outlet air at the outlet 24 during cold weather.

The brine solution 12 passing through the heat-exchange media 34 includes a higher salt concentration per unit volume and exits the housing 20 via outlet pipe 28 as a concentrated brine solution 13. The concentrated brine solution 13 is achieved by removing water from the diluted brine solution 12 via interaction with the air passing through the heat-exchange media 34 and around the diluted brine solution 12 deposited into the housing 20 via the nozzles 38. The concentrated brine solution 13 passing through the heat-exchange media 34 is received generally within the sloped-brine basin 26 and includes a higher concentration of salt than the diluted brine solution 12 received at the inlet 14 of the housing 20. In one example, the brine solution 12 includes a salt concentration approximately equal to three to seven times that of salt water. The concentrated brine solution 13 travels along the sloped-brine basis 26 and exits the housing 20 via the outlet pipe 28.

With particular reference to FIG. 3, operation of the cooling tower 10, as shown in FIG. 2, will be described in detail. A pump 62 may be disposed generally between the brine pool 17 and the inlet 14 of the cooling tower 10. The pump 62 may draw brine solution 12 from the brine pool 17 and direct the brine solution 12 generally toward the cooling inlet 14 of the cooling tower 10. When the brine solution 12 is extracted from the brine pool 17 and passed through the pump 62, the brine solution 12 may encounter heat exchanger 60, whereby heat reclaimed from the concentrated brine solution 13 exiting the cooling tower 10 is transferred to the brine solution 12 extracted from the brine pool 17 prior to the brine solution 12 reaching the inlet 14 of the cooling tower 10.

The brine solution 12 next encounters the heat exchanger 46 disposed generally at the inlet of the cooling tower 10. The heat exchanger 46 transfers heat to the brine solution 12 to heat the brine solution 12 prior to the brine solution 12 encountering the heat-exchange media 34. The heat exchanger 46 may include a pair of heat exchangers, whereby each heat exchanger is a spiral heat exchanger.

The heat exchangers 46 may be in thermal contact with a refrigeration system 75 having a condenser 76, an evaporator 78, and a compressor 80. The compressor 80 circulates refrigerant generally between the condenser 76 and the evaporator 78, whereby the condenser 76 generally rejects heat to an area generally surrounding the condenser 76 and the evaporator 78 absorbs heat from an area generally surrounding the evaporator 78.

The heat exchangers 46 may be in thermal contact with the condenser 76 such that a conduit 82 extending between the heat exchangers 46 and the condenser 76 allows a transfer of heat from the condenser 76 to the heat exchangers 46. The conduit 82 may include a heat transfer medium such as, for example, glycol, whereby a pump 84 circulates the glycol generally between the heat exchangers 46 and the condenser 76.

When the glycol is circulated adjacent to the condenser 76, heat rejected by the condenser 76 is absorbed by the glycol and transmitted generally to the heat exchangers 46 via conduit 82. The incoming brine solution 12 is circulated past the heat exchangers 46 and may be in thermal contact with the heat exchangers 46 such that the heat absorbed by the glycol from the condenser 76 is transferred from the glycol to heat the incoming brine solution 12 via the heat exchangers 46.

A three-way valve may also be disposed along the conduit 82 to direct the heated glycol toward the heat exchangers 46 and/or to the heat exchangers 42 disposed proximate to the inlet 40 of the heat-exchange assembly 18. In this regard, the three-way valve balances the distribution of heat from the condenser 76 between the heat exchangers 46 disposed proximate to the inlet 14 of the cooling tower 10 and between the heat exchangers 42 disposed proximate to the inlet 40 of the heat-exchange assembly 18. In one configuration, the three-way valve may be in communication with the controller 56, whereby the controller controls operation of the three-way valve. The controller 56, in controlling operation of the three-way valve 86, may then control the amount of heat supplied from the condenser 76 to the heat exchangers 46 disposed proximate to the inlet 14 of the cooling tower 10 and to the heat exchangers 42 disposed proximate to the inlet 40 of the heat-exchange assembly 18. Controlling the amount of heat supplied to the heat exchangers 46 at the inlet 14 controls the amount of heat supplied to the incoming brine solution 12. Likewise, controlling the amount of heat supplied to the heat exchangers 42 disposed proximate to the inlet 40 of the heat-exchange assembly 18 controls the amount of heat supplied to the incoming air received by the cooling tower 20. Balancing the heat supplied to the incoming brine solution 12 and the incoming air to the housing 20 may be dictated by factors such as, for example, ambient air conditions, humidity, and the salinity of the incoming brine solution 12.

The heat exchangers 58 disposed proximate to the moist-air outlet 24 may be used to balance the heat supplied to the heat exchangers 46. For example, the heat exchangers 58 may be in thermal contact with the evaporator 78, such that the evaporator cools the heat exchangers 58. In one configuration, a conduit 86 fluidly couples the heat exchangers 58 to a pump 88. The pump 88 circulates a fluid such as, for example, glycol within the conduit 86 and proximate to the evaporator 78. Circulating the glycol in close proximity to the evaporator 78 cools the glycol circulating within the conduit 86 and, thus, also cools the heat exchangers 58. Cooling the heat exchangers 58 increases the ability of the heat exchangers 58 to cool and extract moisture from air exiting the moist-air outlet 24. Furthermore, absorbing heat from the evaporator 78 improves the efficiency of the evaporator 78 in absorbing heat and transferring the absorbed heat to the condenser 76 for use by the condenser 76 in heating the heat exchangers 42, 46.

As described above, the heat transferred from the condenser 76 generally to the conduit 82 in contact with the condenser 76 essentially transfers the heat rejected from the condenser 76 to the heat exchangers 42, 46. Transferring the heat from the condenser 76 to the heat exchangers 42, 46 allows the heat exchangers 42, 46 to heat incoming air 20 and incoming brine solution 12 respectfully. Heating the incoming air and the incoming brine solution 12 increases the ability of the heat-exchange assembly 18 in extracting water from the brine solution. Furthermore, placing conduit 86 in thermal contact with the evaporator 78 allows the heat absorbed by the evaporator 78 to cool the conduit 86 by absorbing heat from the conduit 86. Absorbing heat from the conduit 86 allows the glycol disposed generally within the conduit 86 to then cool the heat exchangers 58 disposed proximate to the moist-air outlet 24. As described above, cooling the heat exchangers 58 allows the heat exchangers 58 to cool the exiting air stream and therefore remove moisture from the air stream prior to expelling the air via the moist-air outlet 24. Removing cooling and removing moisture from the air prior to expelling the air at the moist-air outlet 24 aids in preventing ice and/or snow formation during cold weather.

Once the incoming brine solution 12 is heated by the heat exchangers 46, the brine solution may be sent to the heat-exchange assembly 18. The heat-exchanger assembly 18 operates as described above to remove moisture from the incoming brine solution 12 to provide the concentrated brine solution 13. The concentrated brine solution 13 exits the heat-exchange assembly 18 and is sent back to the brine pool 17.

Upon exiting the heat-exchange assembly 18, the concentrated brine solution 13 is returned to the brine pool 17. However, prior to reaching the brine pool 17, the concentrated brine solution 13 may come in thermal contact with the heat exchanger 60 to allow the heat exchanger 60 to extract heat from the concentrated brine solution 13 prior to returning the concentrated brine solution 13 to the brine pool 17. As described above, the heat extracted from the concentrated brine solution 13 may be transferred to the brine solution received by the heat exchangers 46.

What is claimed is:

1. A brine treatment system for evaporating water from a brine solution, the brine treatment system comprising:
    a housing having an air inlet and a brine inlet, said brine inlet receiving the brine solution;
    an evaporative chamber in the housing and containing a heat-exchange media constructed to receive the brine solution that suspends the brine solution and at least one nozzle in fluid communication with said brine inlet, said at least one nozzle receiving the brine solution from said brine inlet and transferring the brine solution from said brine inlet to said heat-exchange media to allow said heat-exchange media to transfer moisture from the brine solution to air received from said air inlet to reduce the moisture content of the brine solution; and
    a moist air chamber positioned in the housing and including an air outlet and at least one mist eliminator, the moist air chamber being in fluid communication with the evaporative chamber and receiving moist air from the evaporative chamber, the at least one mist eliminator being adapted to pass water vapor therethrough and capture particulates from the moist air.

2. The brine treatment system of claim 1, wherein said heat-exchange media permits said air to pass therethrough to absorb moisture from the suspended brine solution.

3. The brine treatment system of claim 1, wherein said at least one nozzle includes a plurality of nozzles.

4. The brine treatment system of claim 1, further comprising at least one heat tube disposed between said at least one nozzle and said heat-exchange media to heat the brine solution.

5. The brine treatment system of claim 1, wherein said heat-exchange media includes a series of webs or ribs that suspend the brine solution while concurrently allowing said air to pass therethrough.

6. The brine treatment system of claim 1, wherein said heat-exchange media is positioned at an angle relative to a bottom of said housing.

7. The brine treatment system of claim 1, wherein said air outlet allows said air to carry said moisture removed from the brine solution out of said housing.

8. The brine treatment system of claim 1, further comprising a first heat exchanger disposed proximate to said brine inlet and operable to heat the brine solution entering said housing.

9. The brine treatment system of claim 8, further comprising a controller controlling the amount of heat supplied by said first heat exchanger.

10. The brine treatment system of claim 8, further comprising at least one fan causing air to enter said inlet and encounter said heat-exchange assembly.

11. The brine treatment system of claim 1 wherein the at least one nozzle is adapted to mist the brine solution to improve evaporation of water from the brine solution.

12. The brine treatment system of claim 1 further comprising heat tubes positioned between said at least one nozzle and the heat exchange media.

13. The brine treatment system of claim 1, wherein the at least one mist eliminator comprises a plurality of mist eliminators adapted to pass water vapor therethrough and capture particulates from the moist air.

14. A brine treatment system for evaporating water from a brine solution, the brine treatment system comprising:
    a housing having a brine inlet, an air inlet and an air outlet, said housing receiving air at said air inlet;
    a first heat exchanger disposed proximate to said air inlet and operable to heat air entering said housing;
    a second heat exchanger disposed proximate to said air outlet and operable to heat air exiting said housing;
    a third heat exchanger disposed proximate to said brine inlet, said third heat exchanger operable to heat the brine solution prior to the brine solution reaching the heat-exchange assembly; and
    a heat-exchange assembly including a heat exchange media constructed to receive the brine solution and disposed generally within said housing and suspending the brine solution therein, at least one nozzle for depositing the brine solution on said heat-exchange media, and at least one heat tube disposed between said at least one nozzle and said heat-exchange media, said heat-exchange media operable to transfer moisture from the brine solution to said air to reduce the moisture content of the brine solution.

15. The brine treatment system of claim 14, wherein said heat-exchange media includes a series of webs or ribs that suspend the brine solution while concurrently allowing said air to pass therethrough.

16. The brine treatment system of claim 14, wherein said heat-exchange media is positioned at an angle relative to a bottom of said housing.

17. The brine treatment system of claim 14, further comprising a controller controlling the amount of heat supplied by at least one of said first heat exchanger, said second heat exchanger, and said third heat exchanger.

* * * * *